United States Patent
Dietl et al.

(10) Patent No.: US 8,112,984 B2
(45) Date of Patent: Feb. 14, 2012

(54) METHOD AND DEVICE FOR THE DIAGNOSIS OF THE EFFECTIVENESS OF A CATALYTIC CONVERTER

(75) Inventors: Roland Dietl, Regensburg (DE); Hans-Peter Rabl, Kelheim (DE); Janos Radeczky, Wenzenbach (DE)

(73) Assignee: Continental Automotive GmbH, Hannover (DE)

( * ) Notice: Subject to any disclaimer, the term of this patent is extended or adjusted under 35 U.S.C. 154(b) by 482 days.

(21) Appl. No.: 12/299,321

(22) PCT Filed: Jan. 18, 2007

(86) PCT No.: PCT/EP2007/050470
§ 371 (c)(1),
(2), (4) Date: Jul. 13, 2009

(87) PCT Pub. No.: WO2007/128593
PCT Pub. Date: Nov. 15, 2007

(65) Prior Publication Data
US 2010/0011744 A1  Jan. 21, 2010

(30) Foreign Application Priority Data
May 5, 2006 (DE) .......................... 10 2006 021 091

(51) Int. Cl.
*F01N 3/36* (2006.01)
(52) U.S. Cl. .......................................... 60/277; 60/286
(58) Field of Classification Search ............... 60/277, 60/280, 285, 286
See application file for complete search history.

(56) References Cited

U.S. PATENT DOCUMENTS

| 5,647,205 A | 7/1997 | Wier et al. ............... 60/274 |
| 2004/0112044 A1 | 6/2004 | Plote et al. ............... 60/277 |
| 2005/0016266 A1 | 1/2005 | Rabl ............... 73/118.1 |

FOREIGN PATENT DOCUMENTS

| DE | 4308894 | 3/1993 |
| DE | 10113010 | 9/2002 |
| DE | 10254477 | 6/2004 |
| EP | 0621400 B1 | 3/1999 |
| EP | 1496225 | 1/2005 |
| EP | 1591651 | 11/2005 |

OTHER PUBLICATIONS

International Search Report and Written Opinion; PCT/EP2007/050470; pp. 11, May 2, 2007.

*Primary Examiner* — Thomas Denion
*Assistant Examiner* — Jonathan Matthias
(74) *Attorney, Agent, or Firm* — King & Spalding L.L.P.

(57) ABSTRACT

In a method and a device for the diagnosis of the effectiveness of a catalytic converter in the exhaust gas line when using a very late afterinjection or secondary injection, in order to provide a sensitive and yet robust diagnostic method while saving costs for additional exhaust gas temperature sensors and with fuel consumption increased only to a minimum extent, the diagnostic method delivering reliable results with only little delay, and a corresponding device which can also easily be used in various concepts for internal combustion engines, an increased compressor output, caused in the course of the test injection, of an exhaust gas turbocharger used downstream of the catalytic converter produce a higher charge pressure or a marked increase in the air mass flow (mL) such that the effectiveness of the catalytic converter is determined from a change in the intake air quantity of the internal combustion engine.

5 Claims, 1 Drawing Sheet

METHOD AND DEVICE FOR THE DIAGNOSIS OF THE EFFECTIVENESS OF A CATALYTIC CONVERTER

CROSS-REFERENCE TO RELATED APPLICATIONS

This application is a U.S. National Stage Application of International Application No. PCT/EP2007/050470 filed Jan. 18, 2007, which designates the United States of America, and claims priority to German Application No. 10 2006 021 091.3 filed May 5, 2006, the contents of which are hereby incorporated by reference in their entirety.

TECHNICAL FIELD

The present invention relates to a method and a device for diagnosing the effectiveness of a catalytic exhaust converter in the exhaust gas line of an internal combustion engine by using a very late after-injection and/or secondary injection.

BACKGROUND

From the prior art it is known to provide a secondary injection in such a way that the injected fuel still ignites and as a result of the combustion in the expansion phase the exhaust gas temperature rises. This means, in accordance with the teaching of EP 0 621 400 B1, that a catalytic converter disposed in the exhaust gas line is heated from a cold state up to an operating temperature more quickly.

From DE 100 61 796 A1, by purposeful use of secondary injection a response characteristic of a downstream exhaust-gas turbocharger is improved in that the subsequently injected fuel is converted substantially only in the region of the catalytic converter and brings about a marked rise of temperature and enthalpy of the exhaust gas there. The exhaust-gas turbocharger is consequently run up faster, which particularly during acceleration is important. During acceleration, and hence above all given previous travel at less than normal speed, the turbocharger at the exhaust side initially does not have the correct quantity of exhaust gas to generate the charge-air pressure required for the acceleration operation. This slow response characteristic is also known colloquially as turbo lag. By transposing the teaching from DE 100 61 796 A1 this turbo lag is reduced. Also known, moreover, are methods that by additionally injecting fuel into the late working stroke or into the expulsion cycle of an internal combustion engine supply substantially unburnt fuel to the catalytic converter disposed in the exhaust gas line. In this method, by measuring the temperature characteristic the exothermal reactions arising in the catalytic converter are determined. The determination of the exothermal reactions is in turn evaluated as a measure of the conversion capability and hence the operating ability of the catalytic converter. These methods work with excess air and may therefore be used in all lean-burn engines and in particular in gasoline direct injection engines and diesel engines. For this purpose, however, an additional exhaust-gas temperature sensor is required.

A method of determining a catalytic converter temperature on the basis of various operating variables of the drive system using a physical model is known from DE 102 54 477 B3. In this specification it is however also pointed out that the provision of a concrete temperature sensor for measuring the catalytic converter temperature works much more accurately.

The previously mentioned teachings for diagnosing the effectiveness of catalytic converters have the fundamental drawback that they provide results only after a long time delay. This is due i.a. to the basic approaches selected, which are based on a balancing of the states in the control mode and in a separately triggered test mode given suitable operating parameters.

A further drawback of known methods is that in arrangements having catalytic converters disposed very close to the engine, for example in the respective cylinder head, in an exhaust manifold or immediately upstream of a turbocharger, the extra equipment outlay and/or processing outlay of these methods is many times higher. This is true especially in the case of modern approaches to engine design, where there is a separate catalytic converter disposed in each outlet channel, these being known as cylinder head catalytic converters.

SUMMARY

While simultaneously saving the cost of additional exhaust-gas temperature sensors and increasing fuel consumption only minimally, a sensitive and yet rugged diagnostic method that delivers reliable results after only a short time delay can be provided. Furthermore, a corresponding device can be provided that combines a low outlay with the ability to be installed in various designs of internal combustion engine.

According to an embodiment, a method of diagnosing the effectiveness of a catalytic exhaust converter in the exhaust gas line of an internal combustion engine, wherein at least one of a very late after-injection and a secondary injection is used as a test injection of fuel, may comprise the step of: causing, in the course of the test injection, an increased compressor delivery rate of an exhaust-gas turbocharger used downstream of the catalytic converter which leads to a higher charge-air pressure and a marked increase of the air-mass flow, so that from a variation of the intake air quantity of the internal combustion engine the effectiveness of the catalytic converter is determined.

According to a further embodiment, a variation of the intake air quantity of the internal combustion engine can be measured by means of an air-mass sensor.

According to another embodiment, a device for diagnosing the effectiveness of a catalytic exhaust converter disposed in an exhaust gas line of an internal combustion engine, wherein the internal combustion engine comprises a control device and means of carrying out at least one of a very late after-injection and secondary injection, may comprise computing means, which are connected to an air-mass sensor in order to determine from a variation of the intake air quantity of the internal combustion engine as an output signal of the air-mass sensor an effectiveness of the catalytic converter.

According to a further embodiment, the computing means can be connected as a trigger of a test injection to the means of carrying out a test injection.

BRIEF DESCRIPTION OF THE DRAWINGS

Further advantageous properties of a method and of a corresponding device are described in detail below with reference to an embodiment and to the drawings. The drawings show.

In both diagrams identical components and method steps are uniformly provided with identical reference characters.

DETAILED DESCRIPTION

Figure 1:
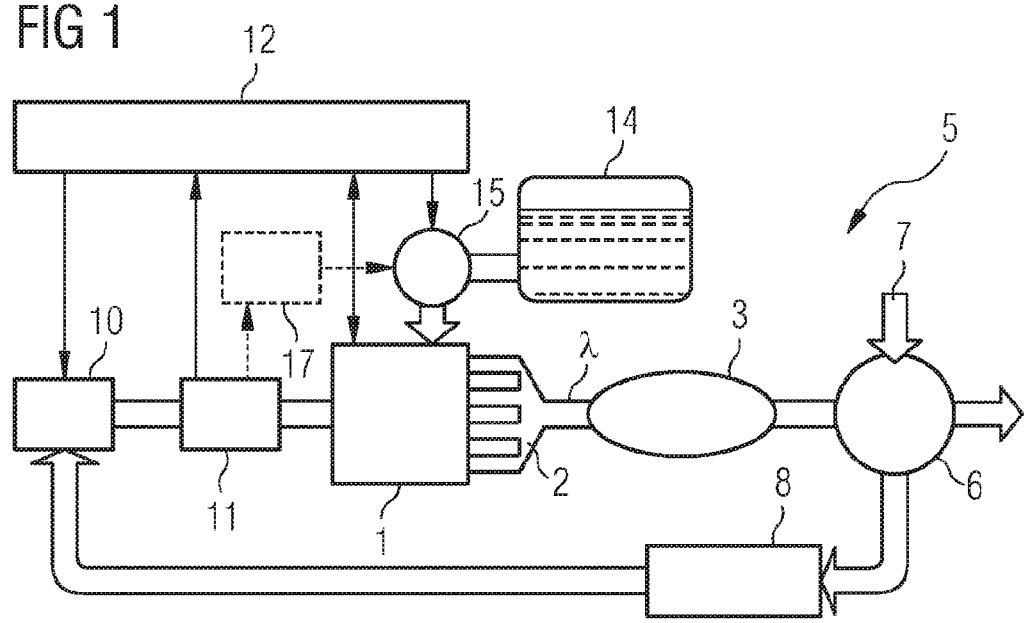
FIG. 1: a block diagram of a drive system for a motor vehicle comprising an internal combustion engine, a catalytic exhaust converter and a downstream exhaust-gas turbogenerator.

A solution according to various embodiments is based on the utilization of the effect whereby fuel, which was injected into the internal combustion engine only in a late working stroke or in an expulsion cycle and is therefore not burned in the cylinder, is converted only in a subsequent exhaust gas line. In particular, this converting of the fuel occurs substantially only at the catalytic converter. The converting of the fuel is an exothermal reaction. This means that in the course of the reaction heat is liberated and leads to an increase of the enthalpy of the exhaust gas. Given the use of such a method in an exhaust gas line, in which an exhaust-gas turbocharger is used downstream of the catalytic converter, the increase of the enthalpy of the exhaust gas flow leads to a higher compressor delivery rate. This increased compressor delivery rate produced in the course of a test injection of fuel in a late working stroke or in the expulsion cycle leads directly to a higher charge-air pressure and/or a marked increase of the air-mass flow at the internal combustion engine itself. This marked variation is detected by a monitoring of the charge-air pressure and of the intake air-mass flow at the internal combustion engine.

By injecting a defined additional test quantity of fuel that takes substantially no part in the combustion in the cylinder, the content of unburnt components in the exhaust gas flow upstream of the catalytic converter is known. In accordance with the efficiency of the catalytic converter this fuel quantity is reduced, wherein this reduction leads to an increase of the exhaust gas enthalpy. The increased exhaust gas enthalpy in turn leads to an increased compressor delivery rate, which in turn is detected by virtue of a variation of the charge-air pressure and of the air-mass flow. There is therefore a direct relationship between the efficiency of the catalytic converter and the increased compressor delivery rate, so that from an easily measurable change of the intake air quantity of the internal combustion engine the effectiveness of the catalytic converter may be determined.

Known temperature-measuring methods entail long time delays of up to 30 seconds before detection of an exothermal reaction, low ruggedness and unsatisfactory sensitivity. In contrast to the known measuring methods, however, according to a method according to various embodiments a sufficiently accurately measurable system reaction is provided by the use of only very low test quantities of fuel and within only a few engine revolutions and/or cylinder strokes. Thus, a method according to various embodiments and a correspondingly constructed device also work far more quickly, ruggedly, sensitively and with much greater fuel economy than is the case with known methods and devices.

In an embodiment, the sequence of a method provides the following component steps. In a preparatory step, after detection of the need for a diagnosis of a catalytic converter suitable operating conditions are awaited. As soon as suitable operating conditions are reached, the following steps are initiated:

- setting and/or detection of the required exhaust gas recirculation rates EGR or shutdown of the exhaust gas recirculation
- setting and/or detection of a required throttle valve position
- determination of the intake-manifold/charge-air pressure, the intake air-mass flow
- activation of the secondary injection characterized by defined injection quantity and time
- determination of the intake-manifold/charge-air pressure or the intake air-mass flow
- determination of the rise of the intake-manifold/charge-air pressure or the intake air-mass flow
- determination of the exhaust gas enthalpy corresponding to this rise
- determination of the efficiency of the catalytic converter from the fed secondary injection quantity and the injection quantity converted at the catalytic converter, taking the EGR rate into account
- with the knowledge of the efficiency and possibly the operating point (characterized for example by temperature and exhaust-gas mass flow), assessment of the catalytic converter with regard to adequate conversion capability.

In an alternative embodiment catalytic converters, so-called cylinder head catalytic converters, are disposed in every outlet channel. Thus, in accordance with a method according to various embodiments with a low outlay the effectiveness of each individual one of these catalytic converters may be checked. For this purpose, two basic possibilities exist:

1. An injection of a defined test quantity occurs, not at every cylinder, but in each case only at one cylinder. The diagnosis of the catalytic converter is then carried out only for this one catalytic converter that is associated with this particular cylinder.
2. The injection of a defined test quantity occurs at a number of cylinders ranging from a plurality of cylinders to all cylinders. Taking into consideration the running time of the individual partial exhaust gas flows which the recirculated exhaust gas requires, it is then possible in the course of a retrospective analysis to determine, in which cylinder afterburning of the exhaust gas of which catalytic converter occurs. Thus, within only a few crankshaft revolutions it is possible to diagnose all of the catalytic converters even of an internal combustion engine of such a complex construction.

In a further alternative embodiment of a method, the objective is to know a respective light-off temperature of an installed catalytic converter. The so-called light-off temperature is a definition indicating at which temperature the catalytic converter converts 50% of the fuel residues contained in the exhaust gas flow. This mark is a measure of the so-called "take-off" of the catalytic converter. In this case, the light-off temperature and/or light-off point provides information about a degree of damage of a respective catalytic converter. Detecting the light-off point is moreover important for the initiation of active catalytic converter heating measures, such as may be carried out i.a. also by defined implementation of secondary injections of unburnt fuel into the exhaust gas tract.

Using a method according to various embodiments and a device of a corresponding construction, a diagnosis of a relevant catalytic converter may be carried out without any need for additional sensors, for example in the form of exhaust-gas composition sensors and/or temperature sensors. These savings, on the one hand, offer clear cost benefits and, on the other hand, also additionally increase the ruggedness of a method and a corresponding device. A diagnosis according to various embodiments is moreover very exact, since the determination of the efficiency of a catalytic converter is effected on the basis of a very accurate measuring method in the form of for example pressure- or flow-rate measurement. Furthermore, a diagnosis according to various embodiments may also be carried out very quickly. Just a few piston strokes are in principle sufficient for this purpose. The advantage of this property lies once more in a marked increase of the ruggedness and in an only minimal extra fuel outlay, which, given implementation for example in a test cycle on the roller-type test stand in accordance with the European Driving Schedule of the Motor Vehicle Emissions Group, MVEG for short, or corresponding simulations in accordance with US or Japanese standards, is negligibly low. Finally, such a so-called "take-off" of the catalytic converter may also be detected, which may be utilized i.a. to initiate active catalytic converter heating measures but also to assess catalytic converter damage.

The diagram of FIG. 1 shows a simplified block diagram of a drive system for a motor vehicle comprising an internal combustion engine 1 with exhaust-gas outlet channels 2 and with a catalytic converter 3 disposed as close to the engine as possible. In the exhaust gas line 5 that begins with the outlet channels 2, a turbocharger 6 is connected downstream of the catalytic converter 3. In order to utilize the highest possible exhaust gas temperatures, the turbocharger 6 is likewise disposed as close to the engine as possible and hence effects the most effective possible precompression of fresh air 7. The fresh air pre-compressed by the turbocharger 6 is directed through a charge-air cooler 8 for regulation of an air quantity and/or air mass, which is to be supplied to the internal combustion engine 1, by means of a throttle valve 10. An air mass $m_L$ is detected directly at the input of the internal combustion engine 1 by an air-mass sensor 11. An output signal of the air-mass signal 11 is supplied to an electronic control device 12 of the internal combustion engine 1. The electronic control device 12 controls means 15, which are in communication with a tank 14, for mixture formulation in cooperation with activation of the throttle valve 10. In a manner that is not graphically represented in detail, a signal defined in each case by a driver is processed in the electronic control device 12.

Associated with the control device 12 in the present embodiment is a logic 17, by means of which the mixture formulation means 15 are activated to release a test injection at a defined time and of a defined fuel quantity. This test injection is implemented as an after- and/or secondary injection at such an angle and/or time that the injected fuel leaves the cylinder through the exhaust-gas outlet channels 2 substantially unburnt. The resulting mixture is then only converted in the catalytic converter 3, so that further along the exhaust gas line 5 the enthalpy upstream of the turbocharger 6 markedly increases. In the course of this increased enthalpy, a substantially increased amount of air mass $m_L$ is conveyed by the turbocharger 6 through the charge-air cooler 8 to the throttle flap 10 and subsequently detected by the sensor 11. A corresponding output signal of the sensor 11 is then supplied to the logic 17, which from the known values prior to introduction of the test injection and during the test injection of very short duration may draw conclusions about the efficiency and hence the operating ability of the catalytic converter 3.

Figure 2:
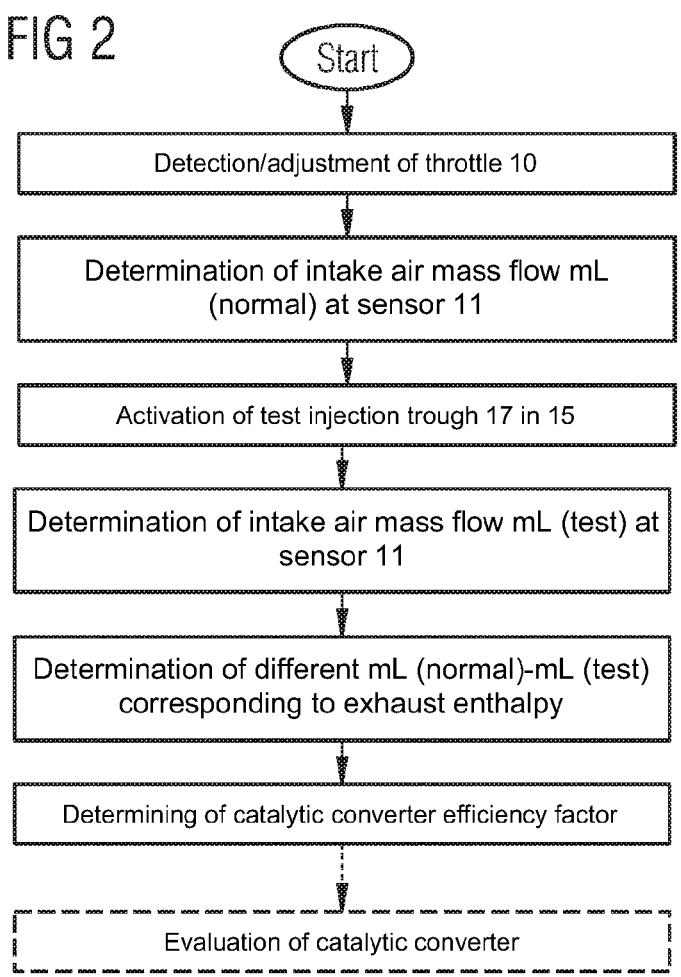
FIG. 2: a flow diagram of a test method for the catalytic exhaust converter according to FIG. 1.

In the present embodiment, the computing means 17 are designed as a trigger of a test injection. For this purpose, the computing means 17 are connected to the means 15 of implementing a test injection and hence define the start according to the flow diagram of to FIG. 2, as described below.

In an exemplary embodiment, the sequence of a method according to the diagram of FIG. 1 provides a shutdown of the exhaust gas recirculation. This simplifies the method below because there is no longer any need to take an EGR rate into account when determining the efficiency of a catalytic converter. According to the flow diagram of FIG. 2, in the device according to FIG. 1 having been triggered by the logic 17 a method having the following component steps is executed: after detection (not represented in detail) of the need for a diagnosis of the catalytic converter 3, here for example as a result of the time rundown of time- and usage-defined intervals, suitable operating conditions of the internal combustion engine 1 are awaited. As soon as suitable operating conditions are reached, the following steps are initiated:

setting and/or detection of a required position of the throttle valve 10;

determination of the intake-manifold/charge-air pressure, the intake air-mass flow $m_L$;

activation of the secondary injection in the means 15, characterized by defined injection quantity and time;

determination of the intake-manifold/charge-air pressure or the intake air-mass flow $m_L$ (normal);

determination of the rise of the intake-manifold/charge-air pressure or the intake air-mass flow $m_L$ (test injection);

determination of the exhaust gas enthalpy corresponding to this rise in flow direction downstream of the catalytic converter 3;

determination of the efficiency of the catalytic converter from the supplied secondary injection quantity and the injection quantity converted at the catalytic converter 3;

with the knowledge of the efficiency and possibly the operating point characterized in this example by temperature and exhaust-gas mass flow, assessment of the catalytic converter 3 with regard to adequate conversion capability.

This method works very quickly, with it being possible in principle to dispense with additional sensors. The diagnosis is moreover very exact, because the determination of the efficiency of a catalytic converter is effected on the basis of a pressure- and flow-rate measurement using a very accurate measuring methodology.

What is claimed is:

1. A method of diagnosing the effectiveness of a catalytic exhaust converter in the exhaust gas line of an internal combustion engine, wherein at least one of a very late after-injection and a secondary injection is used as a test injection of fuel, the method comprising the step of: causing, in the course of the test injection, an increased compressor delivery rate of an exhaust-gas turbocharger used downstream of the catalytic converter which leads to a higher charge-air pressure and a marked increase of the air-mass flow, so that from a variation of the intake air quantity of the internal combustion engine the effectiveness of the catalytic converter is determined.

2. A method according to claim 1, wherein a variation of the intake air quantity of the internal combustion engine is measured by means of an air-mass sensor.

3. A method of diagnosing the effectiveness of a catalytic exhaust converter in the exhaust gas line of an internal combustion engine, the method comprising the steps of:

after detection of a need for a diagnosis of the catalytic converter, a predefined operating conditions of the internal combustion engine are awaited;

as soon as the predefined operating conditions are reached, the following steps are initiated:

setting and/or detection of a required position of a throttle valve;

determining an intake-manifold/charge-air pressure and an intake air-mass flow;

activating a secondary injection with a predefined injection quantity and time;

determining the intake-manifold/charge-air pressure or the intake air-mass flow;

determining of a rise of the intake-manifold/charge-air pressure or the intake air-mass flow;

determining of an exhaust gas enthalpy corresponding to this rise in a flow direction downstream of the catalytic converter;

determining of the efficiency of the catalytic converter from the supplied secondary injection quantity and the injection quantity converted at the catalytic converter.

4. The method according to claim 3, wherein with the knowledge of at least one of the efficiency and the operating point characterized by temperature and exhaust-gas mass flow, the catalytic converter is assessed with regard to adequate conversion capability.

5. The method according to claim 3, wherein the need for a diagnosis is determined as a result of time rundown of time- and usage-defined intervals of the catalytic converter.

* * * * *